(12) United States Patent
Fujita

(10) Patent No.: US 7,695,077 B2
(45) Date of Patent: Apr. 13, 2010

(54) CORELESS RUBBER CRAWLER

(75) Inventor: Yasuaki Fujita, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 310 days.

(21) Appl. No.: 11/791,363

(22) PCT Filed: Dec. 2, 2005

(86) PCT No.: PCT/JP2005/022153

§ 371 (c)(1),
(2), (4) Date: May 23, 2007

(87) PCT Pub. No.: WO2006/059704

PCT Pub. Date: Jun. 8, 2006

(65) Prior Publication Data

US 2008/0007118 A1    Jan. 10, 2008

(30) Foreign Application Priority Data

Dec. 2, 2004    (JP) ............................. 2004-350043

(51) Int. Cl.
*B62D 55/24* (2006.01)
(52) U.S. Cl. ...................... 305/178; 305/165
(58) Field of Classification Search ................ 305/165, 305/166, 167, 170–179
See application file for complete search history.

(56) References Cited

U.S. PATENT DOCUMENTS 6,068,354 A * 5/2000 Akiyama et al. ............ 305/160
6,402,268 B1 6/2002 Lussier (Continued)

FOREIGN PATENT DOCUMENTS

EP    1 437 292 A1    7/2004

(Continued)

OTHER PUBLICATIONS

Extended European Search Report dated Dec. 11, 2008 (6 pages).

*Primary Examiner*—Russell D Stormer
(74) *Attorney, Agent, or Firm*—Sughrue Mion, PLLC

(57) ABSTRACT

To improve the lifespan of a rubber crawler by reducing as much as possible cracks due to bending at the time of wraparound. Bending deformation no longer becomes concentrated at a specific place because bending rigidities at the time of wraparound are not so different from each other overall. For that reason, the occurrence of cracks can be reduced. As a result, the lifespan of the rubber crawler is improved.

A coreless rubber crawler having steel cords embedded in an endless rubber elastic body and in which rubber projections 3 used for driving are formed on an inner peripheral side thereof and rubber lugs 4 are formed on an outer peripheral side thereof, wherein the rubber lugs 4 are divided into right and left rubber lugs from the width-direction center of the rubber crawler, each of the right and left rubber lugs is configured by an inside end area 4a, an outside end area 4b, and a center area 4c that joins these end areas to each other, the inside end areas 4a and the outside end areas 4b extend in the width direction of the crawler, the center areas 4c are diagonally disposed, the inside end areas 4a of the rubber lugs correspond to interspaces between the rubber projections, and the outside end areas 4b of the rubber lugs are disposed in interspaces between the rubber projections.

7 Claims, 4 Drawing Sheets

U.S. PATENT DOCUMENTS

| | | |
|---|---|---|
| 6,474,756 B2 * | 11/2002 | Hori et al. .................. 305/178 |
| D514,133 S * | 1/2006 | Fujita .......................... D15/28 |
| 2002/0024256 A1 | 2/2002 | Hori et al. |
| 2003/0160508 A1 | 8/2003 | Ueno |
| 2004/0066090 A1 | 4/2004 | Akiyama et al. |

FOREIGN PATENT DOCUMENTS

| | | | |
|---|---|---|---|
| JP | 55072469 A * | | 5/1980 |
| JP | 4-18082 U | | 2/1992 |
| JP | 06072362 A * | | 3/1994 |
| JP | 2003-252259 A | | 9/2003 |
| JP | 2004-131014 A | | 4/2004 |
| WO | WO 02/46029 A1 | | 6/2002 |

* cited by examiner

CORELESS RUBBER CRAWLER

TECHNICAL FIELD

The present invention mainly provides a rubber crawler where the occurrence of cracks based on bending deformation at the time of wraparound of a coreless rubber crawler is reduced.

BACKGROUND ART

In a coreless rubber crawler, steel cords are embedded in an endless rubber elastic body in the longitudinal direction thereof, and rubber projections used for driving are formed at a constant pitch on an inner peripheral side thereof and rubber lugs are also formed at a pitch on an outer peripheral side thereof. Additionally, the steel cords serve as a center surface of pulling of the rubber crawler, and when the rubber crawler is wrapped around a sprocket or idler, the rubber on the inside repeatedly receives strain of the compression side and the rubber on the outside repeatedly receives strain of the pulling side.

Additionally, when the rubber projections formed on the inner peripheral surface of the rubber crawler are mainly considered, bending deformation is produced between the rubber projections at the time of wraparound because bending rigidity is low between the rubber projections.

On the other hand, when the rubber lugs are mainly considered, bending deformation is produced between the rubber lugs at the time of wraparound because bending rigidity is low between the rubber lugs.

In this case, when the bending deformation portions at the inner peripheral side and the outer peripheral side (ground side) match, those portions experience bending deformation particularly locally, the strain of the rubber of the ground side surface where the rubber is the pulling side becomes larger, and sometimes cracks occur due to cumulative repeated bending use.

DISCLOSURE OF THE INVENTION

Problem to be Solved by the Invention

It is an object of the present invention to improve the lifespan of a rubber crawler by reducing as much as possible cracks occurring due to bending at the time of wraparound.

Means for Solving the Problem

According to a first aspect of the present invention, there is provided a coreless rubber crawler having steel cords embedded in an endless rubber elastic body in the longitudinal direction thereof and in which rubber projections used for driving are formed on an inner peripheral side thereof and rubber lugs are formed on an outer peripheral side thereof, wherein the rubber lugs are divided into right and left rubber lugs from the width-direction center of the rubber crawler, each of the right and left rubber lugs is configured by an inside end area, an outside end area, and a center area that joins these end areas to each other, the inside end areas and the outside end areas extend in the width direction of the crawler, the center areas are diagonally disposed, the inside end areas of the rubber lugs correspond to interspaces between the rubber projections, and the outside end areas of the rubber lugs are disposed in interspaces between the rubber projections.

According to a second aspect of the present invention, the rubber projections are disposed on the inner peripheral side of the rubber crawler at a constant pitch, and the inside end areas and the outside end areas of the rubber lugs are disposed at a pitch that is the same as the pitch of the rubber projections.

According to a third aspect of the present invention, each of the diagonally disposed center areas is disposed with a coupling area that couples that center area to at least one of the center areas adjacent thereto, such that each of the rubber lugs has an H shape.

According to a fourth aspect of the present invention, the coupling areas are present at least between the rubber lugs corresponding to a rolling wheel passing surface.

According to a fifth aspect of the present invention, the H-shaped rubber lugs are shifted one pitch with respect to a width-direction centerline of the rubber crawler.

EFFECT OF THE INVENTION

In the first aspect of the present invention, bending rigidities are not so different from each other overall even when the rubber crawler is wrapped around, and consequently, bending deformation no longer becomes concentrated at a specific place and the occurrence of cracks can be reduced, so that, as a result, the lifespan of the rubber crawler is improved.

In the second aspect of the present invention, the rubber lugs are disposed so as to overlap at every site when seen in the width direction of the rubber crawler, and balance of bending rigidity becomes possible.

In the third aspect of the present invention, the rigidity between the rubber lugs where rigidity is low rises because the coupling areas are disposed so as to bury the rubber crawler outer peripheral surface. Due to this, the durability of the rubber lugs is improved and it becomes possible to prevent cracks from occurring along the interspaces between the rubber lugs.

In the fourth aspect of the present invention, the rigidity of the rubber lugs at sites where ground surface pressure is high where the rolling wheel passes can be raised because the coupling areas are present in the interspaces between the rubber lugs corresponding to the rolling wheel passing surface, so it becomes possible to further prevent the occurrence of cracks.

In the fifth aspect of the present invention, vibration that occurs can be further reduced because the rolling wheel passing the inner peripheral surface of the rubber crawler always passes the portions where the rubber lugs present and rigidity is high.

BEST MODE FOR CARRYING OUT THE INVENTION

Figure 1:
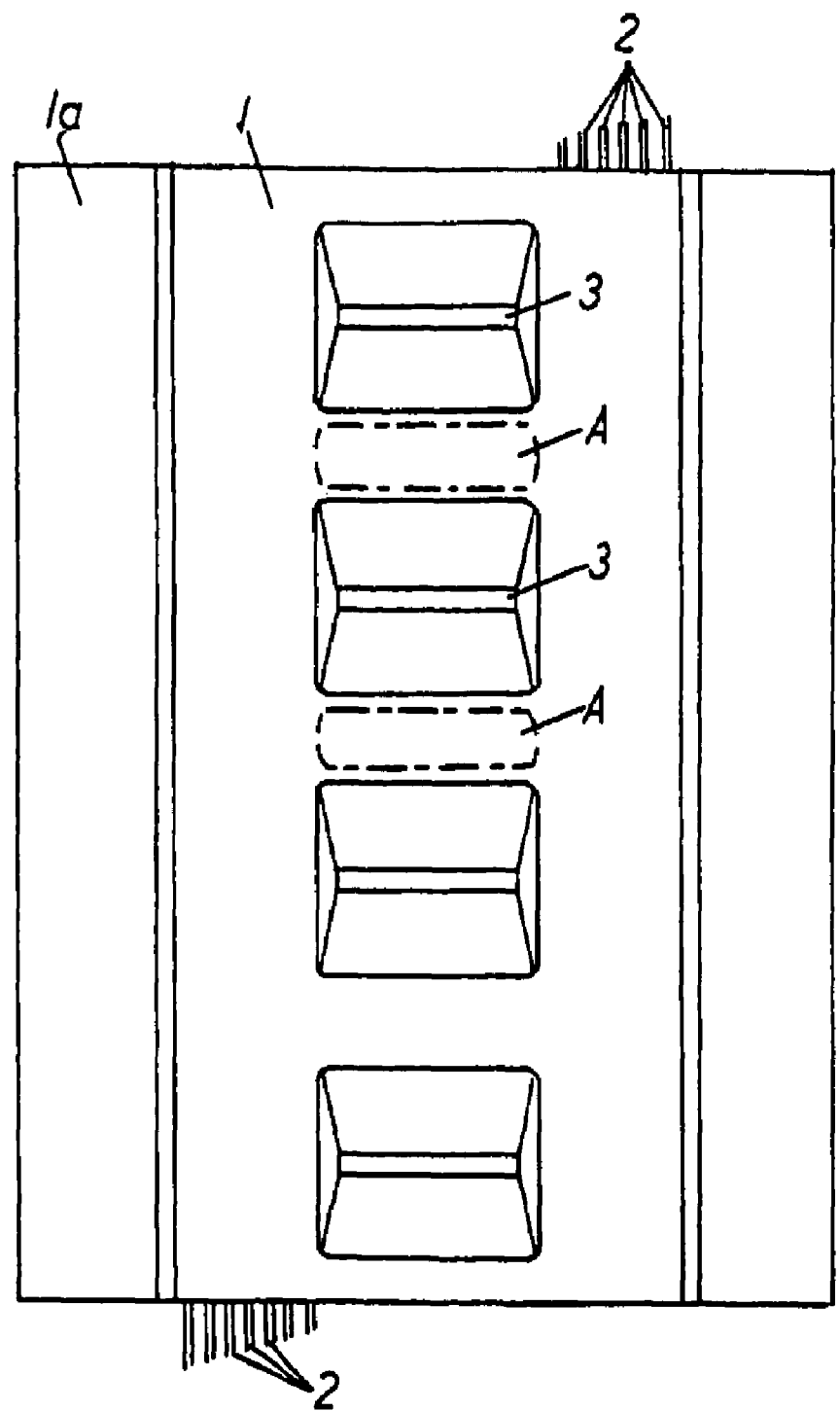
FIG. 1 is an inner peripheral side plan view of a conventional rubber crawler.
Figure 2:
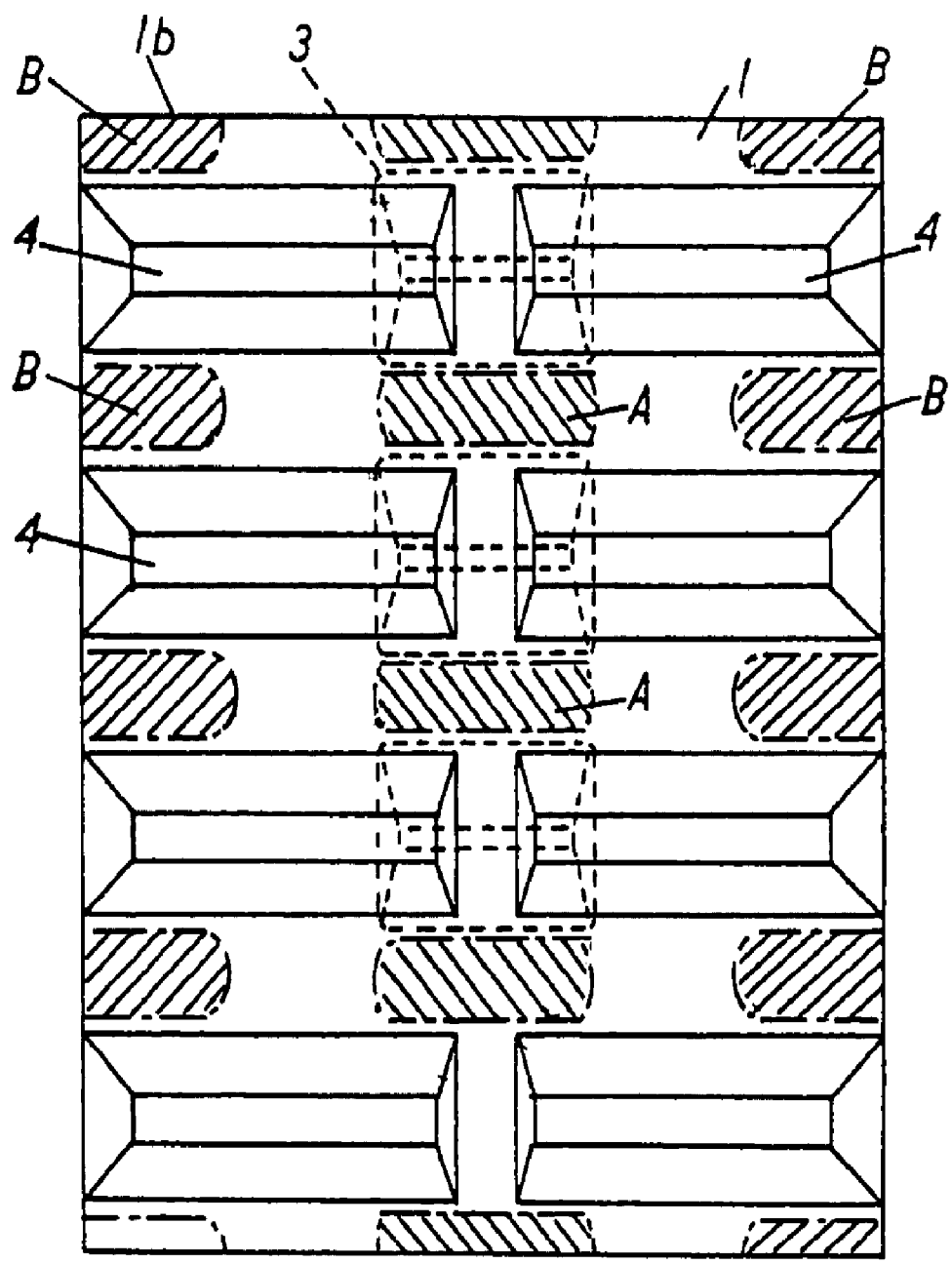
FIG. 2 is an outer peripheral side plan view of the rubber crawler of FIG. 1.

As shown in FIG. 1 and FIG. 2, in a coreless rubber crawler, steel cords 2 are embedded in an endless rubber elastic body 1, rubber projections 3 used for driving are formed at a constant pitch on the inner peripheral side thereof, and rubber lugs 4 are formed at a constant pitch on the outer peripheral side thereof. The steel cords 2 serve as a center surface of pulling of the rubber crawler, and when the rubber crawler is wrapped around a sprocket or idler, rubber 1a at the inside thereof repeatedly experiences strain of the compression side and outside rubber 1b at the outside side thereof repeatedly experiences strain of the pulling side.

In this manner, as mentioned previously, bending deformation is produced in interspaces (A) between the rubber projections 3, 3 at the time of wraparound because bending rigidity is low in the interspaces between the projections 3, 3. Further, bending deformation is produced in interspaces between the rubber lugs 4, 4 at the time of wraparound because bending rigidity is low in the interspaces (B) between the rubber lugs 4, 4. With respect to this tendency, bending deformation is particularly remarkable when both places are lined up linearly in the width direction of the crawler. Additionally, as shown in FIG. 2, ordinarily the rubber lugs are linearly disposed.

When the occurrence of cracks was closely investigated in this kind of rubber crawler, it was discovered that one occurs between the rubber projections in the center portion of the rubber crawler and another one occurs between the rubber lugs at the width end portions (so-called ear portions) of the rubber crawler.

Figure 3:
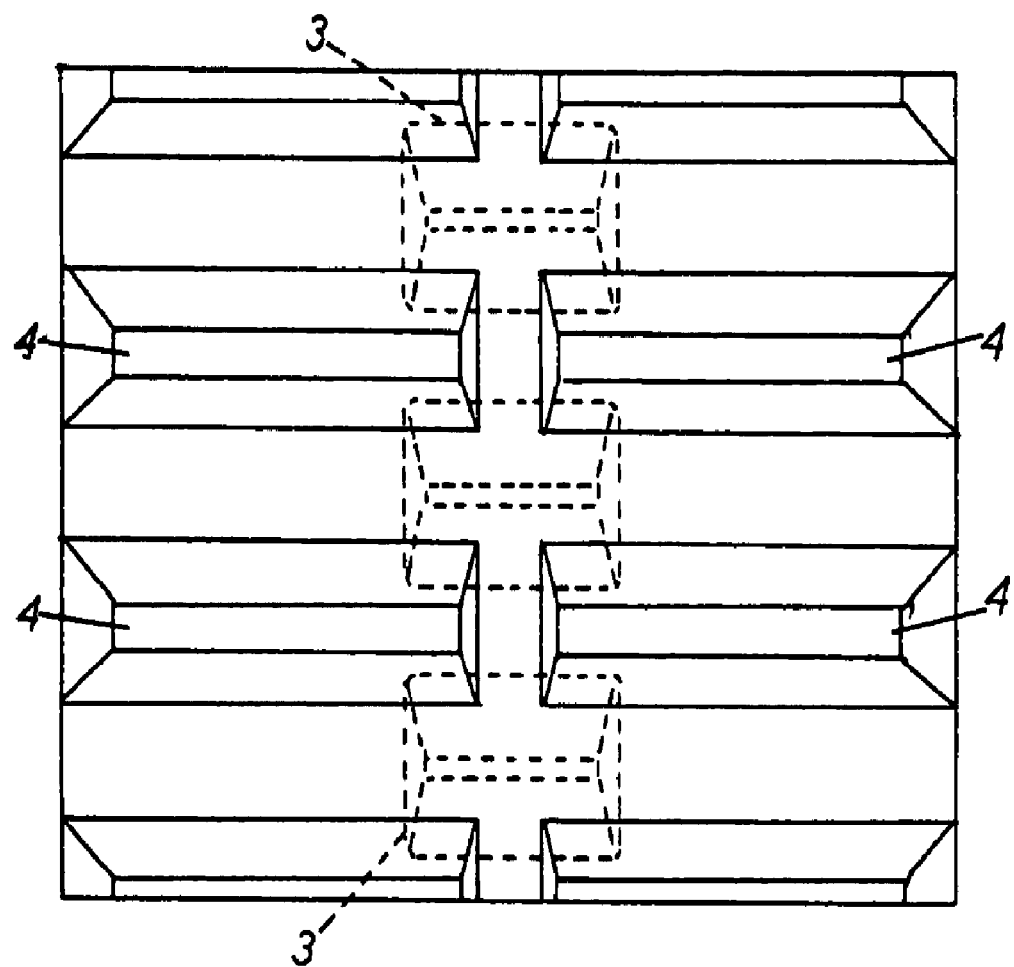
FIG. 3 is a plan view showing the disposition of rubber lugs of a conventional rubber crawler.

For this reason, it is also conceivable to form the rubber lugs 4 linearly in the left-right direction in correspondence to the interspaces between the rubber projections 3, 3 as shown in FIG. 3, but when the rubber lugs 4 are linearly disposed in the left-right direction in this manner, the vertical motion of a rolling wheel that rolls on the inner peripheral surface becomes larger, the occurrence of vibration with respect to the operator cannot be avoided, and traveling vibration performance becomes extremely poor.

The present invention has been made in order to try to simultaneously address balancing the above-described bending rigidity and the occurrence of vibration, and to this purpose, specifies a positional relationship between the rubber projections on the inner peripheral side and the rubber lugs on the outer peripheral side to thereby solve the problem.

That is, the largest characteristic of the present invention is that the rubber lugs are diagonally disposed, and in particular those rubber lugs are diagonally disposed at two sites where cracks occur. The rolling wheel also rolls long on the rubber lugs due to this diagonal disposition of the rubber lugs, and vibration performance is also excellent. Noted that it is also possible to dispose the rubber lugs in a staggered manner at the right and left.

First Embodiment

The present invention will be described in greater detail below on the basis of the drawings.

Figure 4:
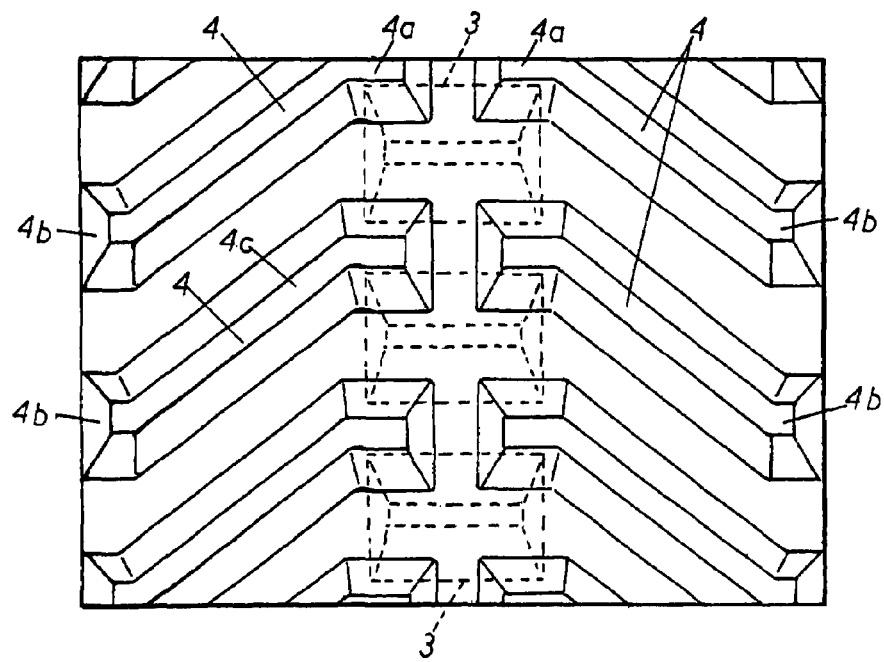
FIG. 4 is an outer peripheral side plan view showing a first embodiment of a rubber crawler of the present invention.

FIG. 4 is an outer peripheral side plan view of a rubber crawler of a first example of the present invention. The inner peripheral side plan view of this rubber crawler is the same as FIG. 1 and will be omitted here. Rubber lugs 4 in this example are each configured by an inside end area 4a, an outside end area 4b, and a center area 4c diagonally disposed so as to join these end areas to each other. The rubber lugs 4 have symmetrical shapes divided into right and left rubber lugs from the center portion of the crawler, and the inside end areas 4a of the rubber lugs 4 are disposed in correspondence to interspaces between rubber projections 3, 3, and the outside end areas 4b of the rubber lugs 4 are disposed at a pitch that is the same as the pitch of the rubber projections and are disposed in the next interspaces between the rubber projections 3, 3.

Because the center areas 4c are diagonally disposed in this manner, rigidity is more balanced in the entire rubber crawler than in a rubber crawler of a conventional structure, and moreover a reduction of vibration of the rolling wheel is achieved. Additionally, the inside end areas 4a and the outside end areas 4c of the lugs are disposed so as to extend in the width direction of the rubber crawler. Usually, when a rubber crawler is wrapped around a sprocket or idler, strain is supposed to become concentrated in the boundary portions between the rubber lugs (portions where rigidity is high) and the interspaces between the rubber lugs (portions where rigidity is low) and preferentially particularly in the inside end areas 4a and the outside end areas 4b of the rubber lugs, but because both of the above-described end areas extend in the width direction of the rubber crawler, strain that occurs becomes received in a wide range, so it becomes difficult for cracks to occur.

Second Embodiment

Figure 5:
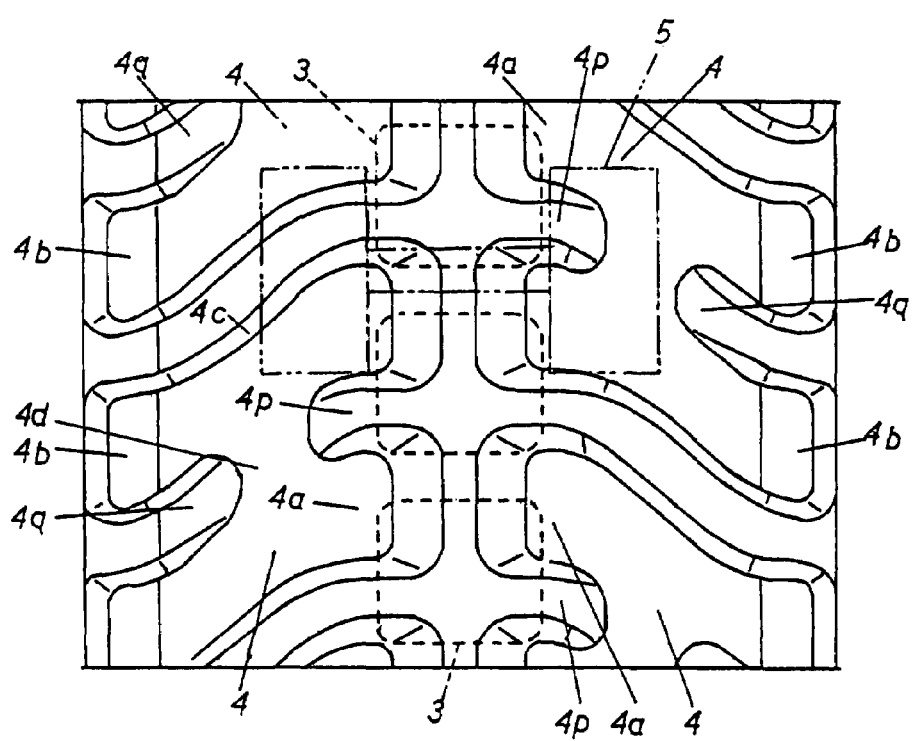
FIG. 5 is an outer peripheral side plan view showing a second embodiment of a rubber crawler of the present invention.

FIG. 5 is an outer peripheral side plan view of a rubber crawler of a second example of the present invention. The inner peripheral side view thereof is the same as FIG. 1 and will be omitted here. Each of the rubber lugs 4 in this example is disposed with a coupling area 4d that couples the diagonally disposed center area 4c to an adjacent center area 4c, so that overall each of the rubber lugs has an H shape flowingly deformed toward the width end portion side, and moreover, the rubber lugs 4 are shifted one pitch at the right and left from the center portion of the rubber crawler so that the rubber lugs 4 are disposed in a staggered manner. In other words, although each of the rubber lugs 4 is of a size corresponding to two of the rubber projections 3, wraparound resistance in the rubber crawler ends up conversely increasing when the width of the rubber lugs 4 is too large, so each of the rubber lugs 4 is given a shape where the center portions at the inside and outside of the rubber lug 4 are notched (4p, 4q) such that overall each of the rubber lugs 4 has an H shape.

The effect of giving the inside end areas 4a and the outside end areas 4b of the rubber lugs 4 shapes extending in the width direction of the rubber crawler is the same as that of the rubber crawler of the first example, but because the rubber lugs here are disposed with the coupling areas 4d, the rigidity between the rubber lugs 4, 4 rises so that the durability of the rubber lugs 4 can be improved. Additionally, cracks can be effectively prevented from occurring between the rubber lugs in the direction along the center areas 4c of the rubber lugs 4.

The above-described coupling areas 4d are disposed in the interspaces between the rubber lugs corresponding to a rolling wheel passing surface 5 of a rolling wheel that passes the rubber crawler inner peripheral surface. High ground surface pressure is applied to the rubber lugs 4 due to passage of the rolling wheel, but the rigidity of the rubber lugs at this site is raised and it becomes possible to effectively prevent cracks from occurring. At the same time, because the H-shaped lugs are shifted one pitch at the right and left from the center portion of the rubber crawler, vibration that occurs can be further reduced because the rolling wheel always passes over the coupling areas 4d.

INDUSTRIAL APPLICABILITY

The present invention is as described above, is one where rigidity particularly in the width direction is balanced as much as possible in the entire rubber crawler, whereby bending deformation is reduced and the occurrence of cracks is reduced, and its range of utilization is extremely wide.

DESCRIPTION OF THE REFERENCE NUMERALS

1 ... Rubber Elastic Body,
1a ... Inner Peripheral Side Rubber,
1b ... Outer Peripheral Side Rubber,
2 ... Steel Cords,
3 ... Rubber Projections,
4 ... Rubber Lugs,
4a ... Inside End Areas of Rubber Lugs,
4b ... Outside End Areas of Rubber Lugs,
4c ... Center Areas of Rubber Lugs,
4d ... Coupling Areas of Rubber Lugs,
4p, 4q ... Notch Portions of Rubber Lugs,
5 ... Rolling Wheel Passing Surface.

What is claimed is:

1. A coreless rubber crawler having steel cords embedded in an endless rubber elastic body in the longitudinal direction thereof and in which rubber projections used for driving are formed on an inner peripheral side thereof and rubber lugs are formed on an outer peripheral side thereof, wherein
    the rubber lugs are divided into right and left rubber lugs from the width-direction center of the rubber crawler;
    each of the right and left rubber lugs is configured by an inside end area, an outside end area, and a center area that joins these end areas to each other;
    the inside end areas and the outside end areas extend in the width direction of the crawler;
    the center areas are diagonally disposed;
    the inside end areas of the rubber lugs correspond to interspaces between the rubber projections;
    the outside end areas of the rubber lugs correspond to interspaces between the rubber projections; and
    each of the diagonally disposed center areas is disposed with a coupling area that couples that center area to at least one of the center areas adjacent thereto such that each of the rubber lugs has an H shape.

2. The coreless rubber crawler of claim 1, wherein the rubber projections are disposed on the inner peripheral side of the rubber crawler at a constant pitch, and the inside end areas and the outside end areas of the rubber lugs are disposed at a pitch that is the same as the pitch of the rubber projections.

3. The coreless rubber crawler of claim 1, wherein the coupling areas are present at least between the rubber lugs corresponding to a rolling wheel passing surface.

4. The coreless rubber crawler of claim 1, wherein the H-shaped rubber lugs are shifted one pitch with respect to a width-direction centerline of the rubber crawler.

5. The coreless rubber crawler of claim 1, wherein the right and left rubber lugs are disposed bilaterally symmetrically with respect to a width-direction centerline of the rubber crawler.

6. The coreless rubber crawler of claim 1, wherein the inside end areas of the rubber lugs correspond to interspaces between the rubber projections, and the outside end areas of the rubber lugs correspond to interspaces between the rubber projections adjacent those interspaces between the rubber projections in the longitudinal direction.

7. The coreless rubber crawler of claim 1, wherein the rubber projections are disposed on a width-direction center line of the rubber crawler and have bilaterally symmetrical shapes.

* * * * *